United States Patent
Verma et al.

(10) Patent No.: US 11,189,103 B2
(45) Date of Patent: Nov. 30, 2021

(54) VISUAL SEARCH REFINEMENT FOR COMPUTER GENERATED RENDERING ENVIRONMENTS

(71) Applicant: Apple Inc., Cupertino, CA (US)

(72) Inventors: Eshan Verma, Mountain View, CA (US); Daniel Ulbricht, Sunnyvale, CA (US); Angela Blechschmidt, San Jose, CA (US); Mohammad Haris Baig, San Jose, CA (US); Chen-Yu Lee, Santa Clara, CA (US); Tanmay Batra, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/924,559

(22) Filed: Jul. 9, 2020

(65) Prior Publication Data

US 2021/0035367 A1 Feb. 4, 2021

Related U.S. Application Data (60) Provisional application No. 62/881,476, filed on Aug. 1, 2019.

(51) Int. Cl.
  *G09G 5/00* (2006.01)
  *G06T 19/00* (2011.01)
(52) U.S. Cl.
  CPC ................... *G06T 19/006* (2013.01)
(58) Field of Classification Search
  CPC .................................................. G06T 19/006
  See application file for complete search history.

(56) References Cited

U.S. PATENT DOCUMENTS

| | | | |
|---|---|---|---|
| 8,055,018 B2 | 11/2011 | Han et al. | |
| 9,269,017 B2 | 2/2016 | Lin et al. | |
| 2013/0307870 A1* | 11/2013 | Ashbrook | G06F 21/84 345/629 |
| 2017/0069134 A1* | 3/2017 | Shapira | G06F 3/011 |
| 2017/0337739 A1 | 11/2017 | Wu et al. | |
| 2018/0053055 A1* | 2/2018 | Finding | G06T 19/006 |
| 2020/0151956 A1* | 5/2020 | Goslin | G06T 19/006 |
| 2021/0011960 A1* | 1/2021 | Chambon-Cartier | G06T 19/006 |

OTHER PUBLICATIONS

Nakajima et al., A Support System for Maintenance Training by Augmented Reality, Proceedings of the 12th International Conference on Image Analysis and Processing, 2003 (Year: 2003).*
Ha, Jaweon, Cho, Kyusung, Rojas, Francisco A., Yang, Hyun S.; "Real-Time Scalable Recognition and Tracking based on the Server-Client Model for Mobile Augmented Reality"; IEEE International Symposium on Virtual Reality Innovation Mar. 19-20, 2011, Singapore, pp. 267-272, 2011.

* cited by examiner

*Primary Examiner* — Charles Tseng
(74) *Attorney, Agent, or Firm* — Thompson Hine LLP (57) ABSTRACT

Various implementations disclosed herein include devices, systems, and methods that enable faster and more efficient real-time physical object recognition, information retrieval, and updating of a CGR environment. In some implementations, the CGR environment is provided at a first device based on a classification of the physical object, image or video data including the physical object is transmitted by the first device to a second device, and the CGR environment is updated by the first device based on a response associated with the physical object received from the second device.

20 Claims, 6 Drawing Sheets

VISUAL SEARCH REFINEMENT FOR COMPUTER GENERATED RENDERING ENVIRONMENTS

CROSS-REFERENCE TO RELATED APPLICATIONS

This Application claims the benefit of U.S. Provisional Application Ser. No. 62/881,476 filed Aug. 1, 2019, which is incorporated herein in its entirety.

TECHNICAL FIELD

The present invention relates to providing a computer generated rendering (CGR) environment, and in particular, to systems, methods, and devices for identifying physical objects and updating the CGR environment based on information associated with the identified physical objects.

BACKGROUND

Providing information at a device (e.g., a portable electronic device) for physical objects detected in image or video data by the device is computationally expensive and time consuming, which often results in considerable processing delays associated with performing segmentation and object recognition of image or video data. For example, a user of the device may walk into a room and experience a considerable delay before any objects in the room are recognized.

SUMMARY

Various implementations disclosed herein include devices, systems, and methods that enable faster and more efficient real-time physical object recognition, information retrieval, and updating of a CGR environment. In some implementations, a device (e.g., a mobile computing device or a head mounted device (HMD)) having a processor, a display, and a camera implements a method to obtain an image or video of a physical setting via the camera. For example, the device may capture a stream of live video. The device classifies a physical object into a category based on feature associated with the physical object that is detected in the image or video and provides a CGR environment on the display based on the category. In some implementations, the device classifies the physical object based on a coarse recognition of the physical object, e.g., based on relatively less information or using processing techniques with lower processing requirements than more fine recognition techniques. Moreover, a particular portion of the image or video may be identified as containing the object. For example, the device may detect that an object is a laptop through a local neural network based on the shape, color, size, volume, markers, or any number of simple or complex features associated with the object, and may display a generic laptop from an asset store based on classifying the physical object in a laptop category. In some implementations, the device may, based on the category, replace, enhance, or supplement the physical object with generic virtual content from an asset store residing on the device.

In some implementations, the device transmits a portion (e.g., some or all) of the image or video to a second device (e.g., server, desktop computer, cloud computing device, etc.). For example, the device may send that part of the image or video that includes the physical object to a second device. In some implementations, the device determines whether the image or video satisfies privacy criteria. Moreover, the device may determine whether to transmit the part of the image or video that includes the physical object to the second device based on the satisfaction of the privacy criteria. In some implementations, the device transmits one or more detected features or the determined category to the second device.

In some implementations, the device receives a response associated with the object and updates the CGR environment on the display based on the response. The response is determined based on an identification of the physical object performed by the second device. The second device identifies the physical object based on a fine recognition of the physical object, e.g., based on relatively more information or using processing techniques with greater processing requirements than the course recognition technique used to classify the object. The second device, for example, may access a robust library of object information that is not available at the first device to identify the particular object or to obtain particular information about the object. For example, the response associated with the object may include an identification of a sub-category (e.g., a brand X laptop computer), an identification of a particular type of item (e.g., a model number), supplemental information (e.g., a user's manual), an animation associated with the object, a 3-D pose, a computer-aided drafting (CAD) model, etc. The device, having received a response from the second device, may change the depiction of the object based on the identification (e.g., displaying the laptop depiction to match the particular model, displaying the user's manual adjacent to the laptop, etc.) or may generate an experience associated with the object (e.g., triggering an animation, providing a 3-D pose, etc.). In some implementations, the received response associated with the object includes identification data (e.g., a vector of attributes, descriptors, etc.) to be used by the device to identify the physical object in a future image or video. Moreover, in some implementations, the received response associated with the object includes an assessment of a condition of the physical object (e.g., whether the device is damaged, undamaged, wet, dry, upright, horizontal, etc.).

In some implementations, the device may then replace the generic virtual content displayed based on the category with object-specific content based on the received response associated with the object.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
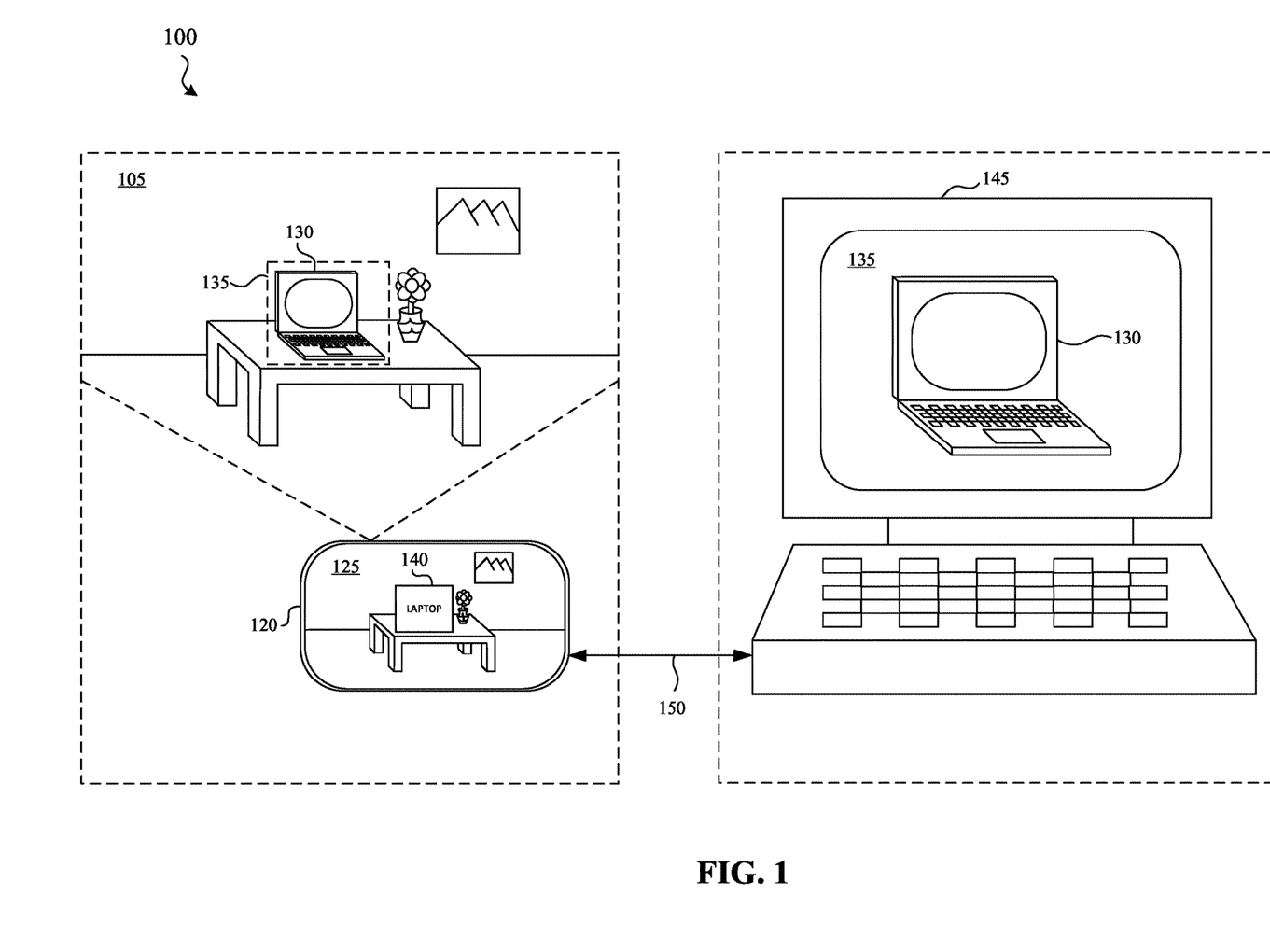
FIG. 1 illustrates a CGR environment of a physical environment provided on a display of a device in accordance with some implementations.
Figure 2:
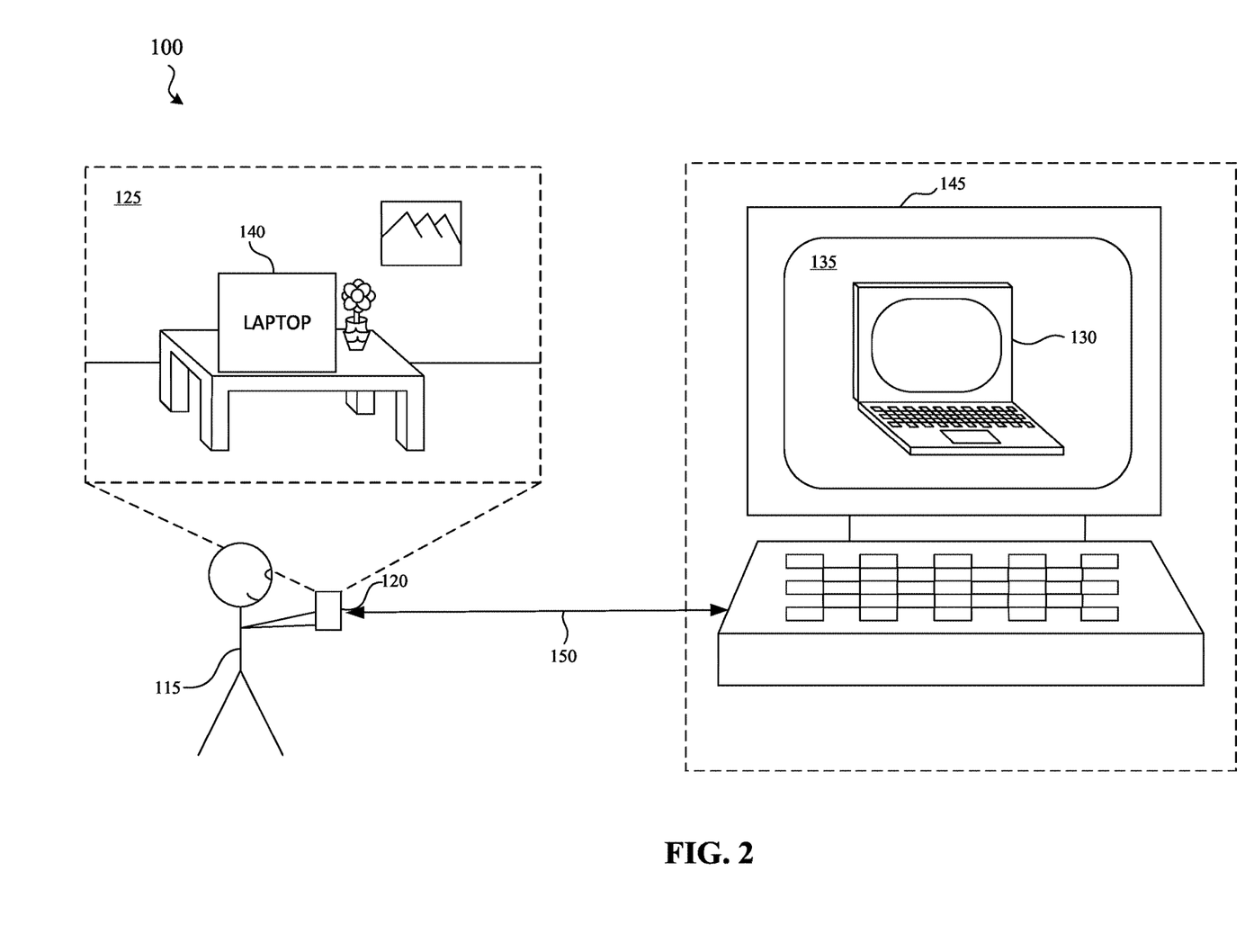
FIG. 2 illustrates the CGR environment provided by FIG. 1 in accordance with some implementations.

Referring to FIGS. 1 and 2, an example operating environment 100 is illustrated in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a device 120 (e.g., a mobile electronic device or a head-mounted device (HMD)) and a device 145 (e.g., a server, cloud computing device, personal computer, or a mobile electronic device), one or both of which may be in a physical setting 105. A physical setting 105 refers to a world that individuals can sense or with which individuals can interact without assistance of electronic systems. Physical settings (e.g., a physical forest) include physical objects (e.g., physical trees, physical structures, and physical animals). Individuals can directly interact with or sense the physical setting, such as through touch, sight, smell, hearing, and taste.

In some implementations, the device 120 is configured to manage and coordinate a computer generated rendering (CGR) environment 125 for the user and, in some implementations, the device 120 is configured to present the CGR environment 125 to the user. In some implementations, the device 120 includes a suitable combination of software, firmware, or hardware. The device 120 is described in greater detail below with respect to FIG. 5.

In some implementations, the device 120 is a computing device that is local or remote relative to the physical setting 105. In some implementations, the functionalities of the device 120 are provided by or combined with a controller (e.g., a local server located within the physical setting 105 or a remote server located outside of the physical setting 105). In some implementations, the device 120 is communicatively coupled with other devices or peripherals via one or more wired or wireless communication channels (e.g., BLUETOOTH, IEEE 802.11x, IEEE 802.16x, IEEE 802.3x, etc.).

According to some implementations, the device 120 presents a CGR environment 125 to the user while the user is present within the physical setting 105. In contrast to the physical setting, a CGR environment refers to an entirely or partly computer-created setting that individuals can sense or with which individuals can interact via an electronic system.

In some implementations, providing a CGR environment 125 includes virtual reality (VR). A VR setting refers to a simulated setting that is designed only to include computer-created sensory inputs for at least one of the senses. A VR setting includes multiple virtual objects with which an individual may interact or sense. An individual may interact or sense virtual objects in the VR setting through a simulation of a subset of the individual's actions within the computer-created setting, or through a simulation of the individual or his presence within the computer-created setting.

In some implementations, providing a CGR environment 125 includes mixed reality (MR). An MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation or location with respect to the physical setting to enable interaction between virtual objects and real objects (which are physical objects from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may include a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical object captured by imaging sensor(s). In another example, a virtual object may exhibit characteristics consistent with actual weather conditions in the physical setting, as identified via imaging, weather-related sensors, or online weather data. In yet another example, an augmented reality forest may have virtual trees and structures, but the animals may have features that are accurately reproduced from images taken of physical animals.

Many electronic systems enable an individual to interact with or sense various forms of mixed reality. One example includes head mounted systems. A head mounted system may have an opaque display and speaker(s). Alternatively, a head mounted system may be designed to receive an external display (e.g., a smartphone). The head mounted system may have imaging sensor(s) or microphones for taking images/video or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one implementation, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

In some implementations, the device 120 displays the CGR environment 125 such that a user 115 can simultaneously view the physical environment 105 on a display of the device 120, e.g., the device displays the CGR environment 125 in a real-world coordinate system with real-world content. In some implementations, such a viewing mode includes visual content that combines the CGR content with the real-world content of the physical environment 105. Moreover, the CGR environment 125 can be video-see-through (e.g., in which real-world content is captured by a camera and displayed on a display with the 3D model) or optical-see-through (e.g., in which real-world content is viewed directly or through glass and supplemented with a displayed 3D model).

For example, the CGR environment 125 may provide the user 115 with video see-through CGR on a display of a consumer cell-phone by integrating rendered three-dimensional (3D) graphics into a live video stream captured by an onboard camera. As another example, CGR environment 125 may provide the user 115 with optical see-through CGR by superimposing rendered 3D graphics into a wearable see-through HMD, electronically enhancing the user's optical view of the real-world with the superimposed 3D model.

In some implementations, the physical environment 10 includes at least one physical object 130. For example, the physical object 130 may be a consumer electronic device (e.g., a laptop), a piece of furniture or art, a photograph, etc. In some implementations, the device 120 receives image or video data, detects the physical object 130, and identifies a portion of an image or video (e.g., a portion of an image or video depicting portion 135 of the physical environment 105) as including the physical object 130.

In some implementations, the device 120 classifies the physical object 130 through a local neural network into a category based on one or more simple or complex features (e.g., shape, color, size, volume, markers, etc.) associated with the physical object 130 and provides a CGR environment 125 that combines the physical environment 105 (e.g., via locally captured images or video of the physical environment 105) and content corresponding to the physical object 130. For example, the device 120 may perform coarse recognition of the physical object 130 (e.g., a laptop) through a local neural network based on one or more simple or complex features associated with the physical object 130 such as shape, color, size, volume, or markers. In some implementations, the device 120 transmits one or more of the features (e.g., shape, color, size, volume, markers, etc.) associated with the physical object to device 145. For example, device 120 may identify markers associated with the physical object 30, transmit the markers to device 145, and device 145 may identify the physical object 130 based on the markers (e.g., the markers may be associated with a specific make and model of laptop).

In some implementations, the device 120 replaces, enhances, or supplements the physical object 130 in the CGR environment 125 with generic virtual content 140. For example, the generic virtual content 140 (e.g., a laptop identifier) may be obtained from an asset store on the device 120 based on the determined category of the physical object 130.

Various implementations enable the device 120 to receive a response associated with the physical object 130 or additional information regarding the physical object 130. In some implementations, the device 120 transmits the portion of the image or video (e.g., the portion of the image or video depicting portion 135 of the physical environment 105 including the physical object 130) to device 145 via a link 150. For example, the device 120 may send the part of the image or video that contains the laptop to device 145 (e.g., a remote server, a personal computer, or a cloud computing device).

For privacy reasons, however, a user 115 may not wish to have data associated with the physical environment 105 sent to device 145 (e.g., a remote server). Thus, in some implementations, device 120 only sends image or video data associated with physical environment 105 to device 145 if the data meets predetermined privacy criteria. Moreover, in some implementations, the device 120 determines whether to send the portion of the image or video to device 145 based on a determination of whether the portion of the image or video satisfies privacy criteria. Such privacy criteria may include whether the image or video includes humans, names, identifying numbers, financial information, etc. In some implementations, the user 115 can specify that they do not wish to send image or video data to device 145. For example, privacy criteria may include whether a configuration setting on device 120 is set to allow the data to be sent to device 145. In some implementations, privacy criteria may include whether the data is associated with a particular category of physical object or is collected at a particular physical location (e.g., a home or work GPS location). Many other privacy criteria, either user-specified or configured at the device level, may also be used to determine whether image or video data is sent to device 145.

In some implementations, the device 145 performs an identification of the physical object 130. For example, the device 145 may identify the physical object 130 at a finer level that the coarse recognition performed by device 120. Moreover, device 120 may transmit the classified category to device 145. For example, device 120 may classify the physical object 30 as a laptop and device 145 may further identify the physical object 130 (e.g., the specific make and model of the laptop).

As illustrated in FIG. 1, in accordance with some implementations the device 120 is a mobile electronics device and in accordance with some implementations the device 120 is an HMD configured to be worn on the head of a user 115. Such an HMD may enclose the field-of-view of the user 115. The device 120 can include one or more screens or other displays configured to display the CGR environment 125. In some implementations, the device 120 includes one or more screens or other displays to display the virtual element with real-world content that is in a field-of-view of the user 115. In some implementations, the device 120 is worn in a way that one or more screens are positioned to display the CGR environment 125 with real-world content of the physical environment 105 in a field-of-view of the user 115. In some implementations, the device 120 that provides CGR environment 125 is a chamber, enclosure, or room configured to present the CGR environment 125 in which the user 115 does not wear or hold the device 120.

Figure 3:
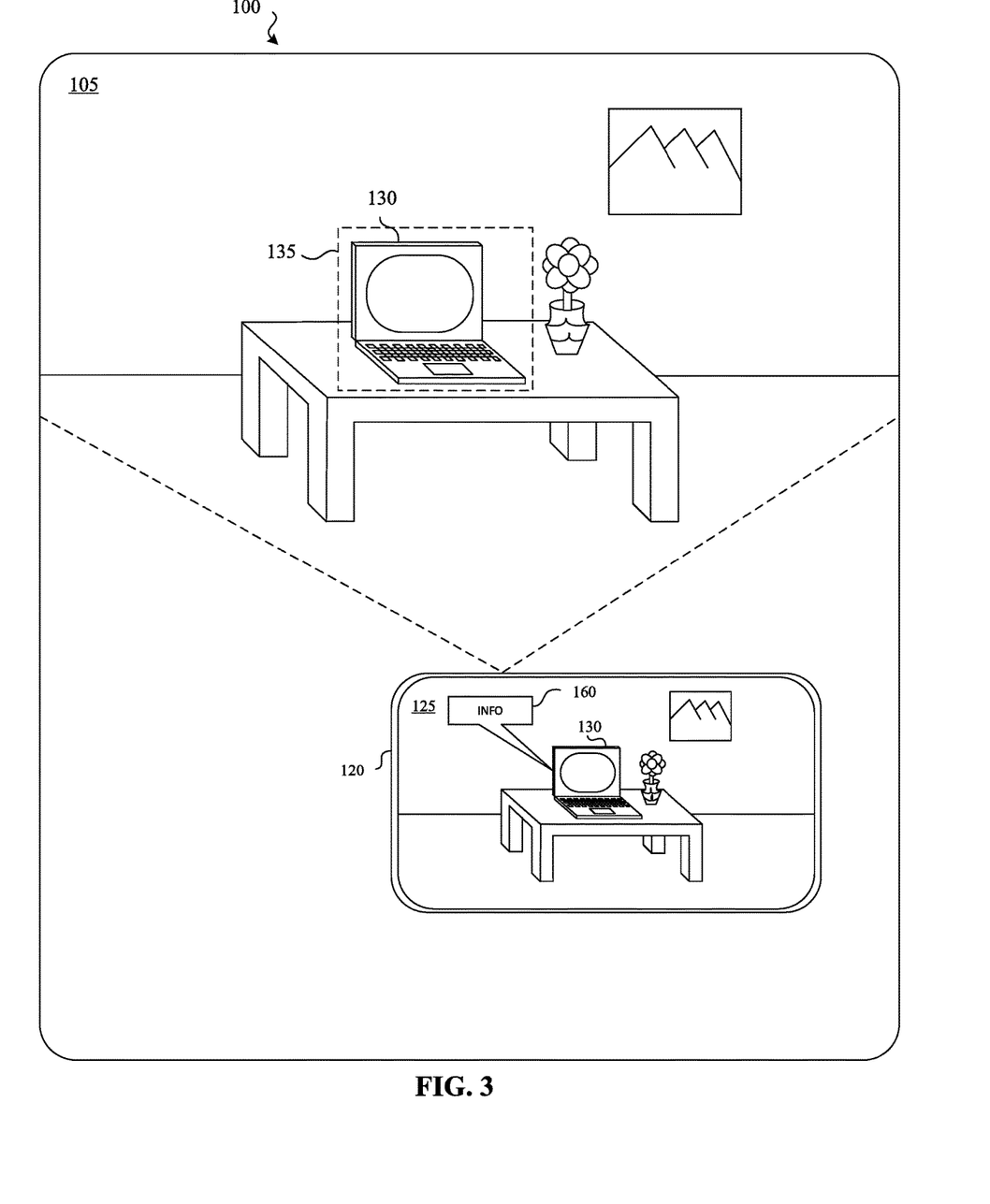
FIG. 3 illustrates a CGR environment provided on a device including object specific content based on a response associated with the physical object received from a second device in accordance with some implementations.
Figure 4:
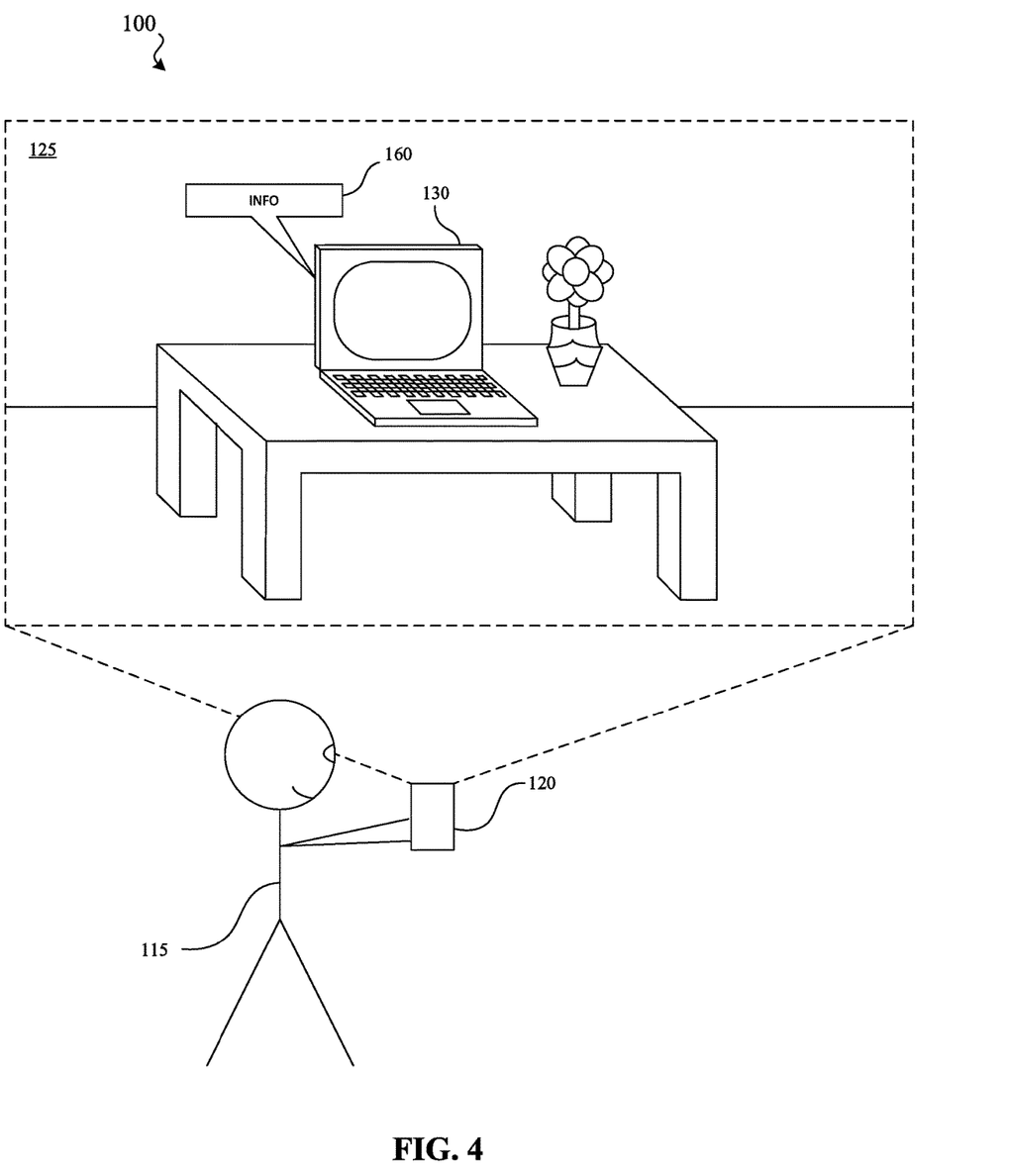
FIG. 4 illustrates the CGR environment provided by Figure in accordance with some implementations.

As illustrated in FIGS. 3 and 4 according to some implementations, device 120 receives a response 160 associated with the physical object 130 that is determined based on the identification of the physical object 130 performed by the device 145. For example, the received response 160 may include an identification of a sub-category, an identification of a particular type of item, or supplemental information.

In some implementations, the information 160 is presented to the user 115 in the CGR environment 125. For example, the information 160 about the physical object 130 may include an identification of a sub-category (e.g., a laptop computer), an identification of a particular type of item (e.g., a model number), supplemental information (e.g., a user's manual, repair information, accessory information, etc.), or an assessment of the condition of the physical object 130. In some implementations, the generic virtual content 140 is replaced with object specific content based on the information 160. For example, a generic laptop depiction may be changed to a depiction of the particular model.

In some implementations, device 120 may receive object identification data from device 145 to be used by device 120 to identify the physical object 130 in a future image or video of a physical environment 105. For example, device 120 may receive three dimensional models, vectors, or descriptors associated with the physical object 130 from device 145. In some implementations, device 120 may generate an experience based on the received response 160. For example, received response 160 may enable or otherwise trigger device 120 to display an animation, a 3-D pose, or a CAD model associated with the physical object 130.

As illustrated in FIG. 3, in accordance with some implementations the device 120 is a mobile electronics device and in accordance with some implementations the device 120 is an HMD configured to be worn on the head of a user 115.

Figure 5:
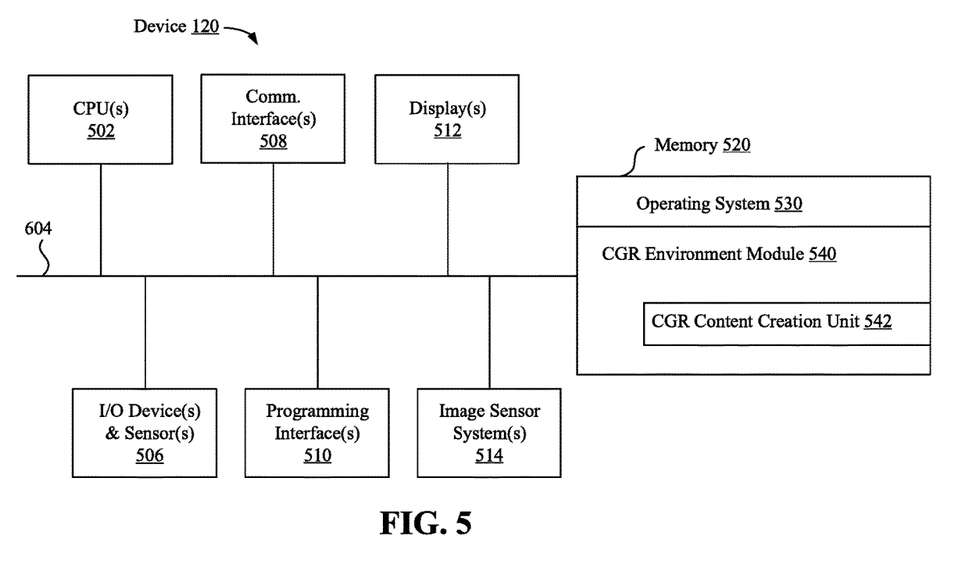
FIG. 5 is a block diagram of an example device in accordance with some implementations.

FIG. 5 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 502 (e.g., microprocessors, ASICs, FPGAs, GPUs, CPUs, processing cores, or the like), one or more input/output (I/O) devices and sensors 506, one or more communication interfaces 508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 510, one or more displays 512, one or more interior or exterior facing image sensor systems 514, a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 512 are configured to present a CGR environment to the user. In some implementations, the one or more displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 512 correspond to diffractive, reflective, polarized, holographic, etc. waveguide displays. For example, the device 120 includes a single display. In another example, the device 120 includes a display for each eye of the user.

In some implementations, the one or more image sensor systems 514 are configured to obtain image or video data that corresponds to at least a portion of the face of the user that includes the eyes of the user. For example, the one or more image sensor systems 514 include one or more RGB camera (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 514 further include illumination sources that emit light upon the portion of the face of the user, such as a flash or a glint source.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and a CGR environment module 540.

The operating system 530 includes procedures for handling various basic system services and for performing hardware dependent tasks. In some implementations, the CGR environment module 540 is configured to create, edit, or experience CGR environments. The content creation unit 542 is configured to create and edit CGR content that will be used as part of CGR environments for one or more users (e.g., a single SR environment for one or more users, or multiple SR environments for respective groups of one or more users). Although these modules and units are shown as residing on a single device (e.g., device 120), it should be understood that in other implementations, any combination of these modules and units may be located in separate computing devices.

Moreover, FIG. 5 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 6:
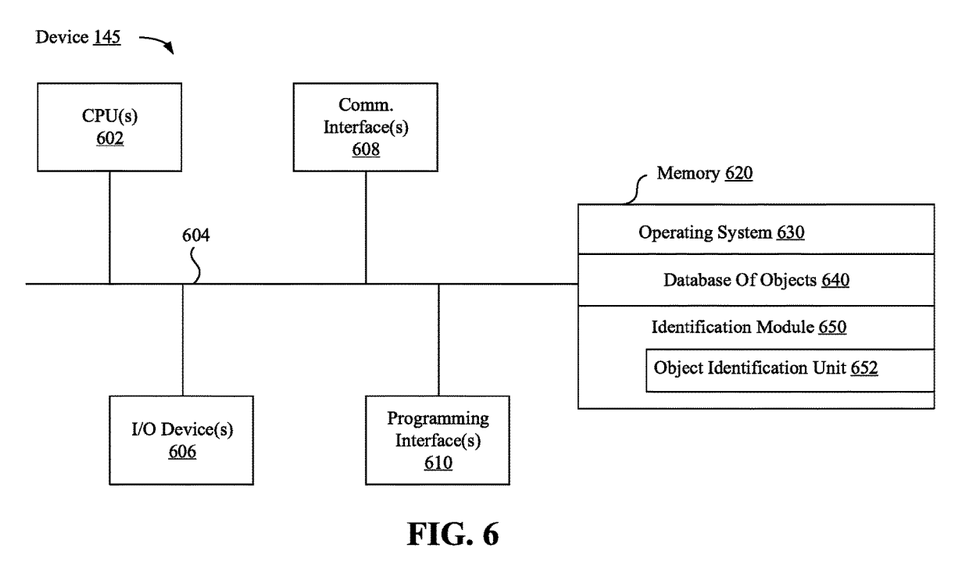
FIG. 6 is a block diagram of an example device in accordance with some implementations.

FIG. 6 is a block diagram of an example of the device 145 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 145 includes one or more processing units 602 (e.g., microprocessors, ASICs, FPGAs, GPUs, CPUs, processing cores, or the like), one or more input/output (I/O) devices and sensors 606, one or more communication interfaces 608 (e.g., USB, FIRE-WIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 610, one or more displays 612, one or more interior or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an IMU, an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 612 are configured to present a CGR environment to the user. In some implementations, the one or more displays 612 correspond to holographic, DLP, LCD, LCoS, OLET, OLED, SED, FED, QD-LED, MEMS, or the like display types. In some implementations, the one or more displays 612 correspond to diffractive, reflective, polarized, holographic, etc. waveguide displays.

In some implementations, the one or more image sensor systems 614 are configured to obtain image or video data that corresponds to at least a portion of the face of the user that includes the eyes of the user. For example, the one or more image sensor systems 614 include one or more RGB camera (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 614 further include illumination sources that emit light upon the portion of the face of the user, such as a flash or a glint source.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules and data structures, or a subset thereof including an optional operating system 630, a database of objects 640, and an identification module 650.

In some embodiments, the database of objects 640 includes characteristics (e.g., shape, color, size, volume, or markers) associated with specific physical objects or object categories. For example, the database of objects 640 may include any information associated with an object that facilitates identification of a physical object. Furthermore, in some embodiments, the database of objects 640 includes a library of models or virtual content associated with physical objects or categories of physical objects.

The operating system 630 includes procedures for handling various basic system services and for performing hardware dependent tasks. In some implementations, the identification module 650 is configured to identify physical objects. The object identification unit 652 is configured to access, create, and edit object identification data that will be used to identify or categorize physical objects. Although these modules and units are shown as residing on a single device (e.g., device 145), it should be understood that in other implementations, any combination of these modules and units may be located in separate computing devices.

Moreover, FIG. 6 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 7:
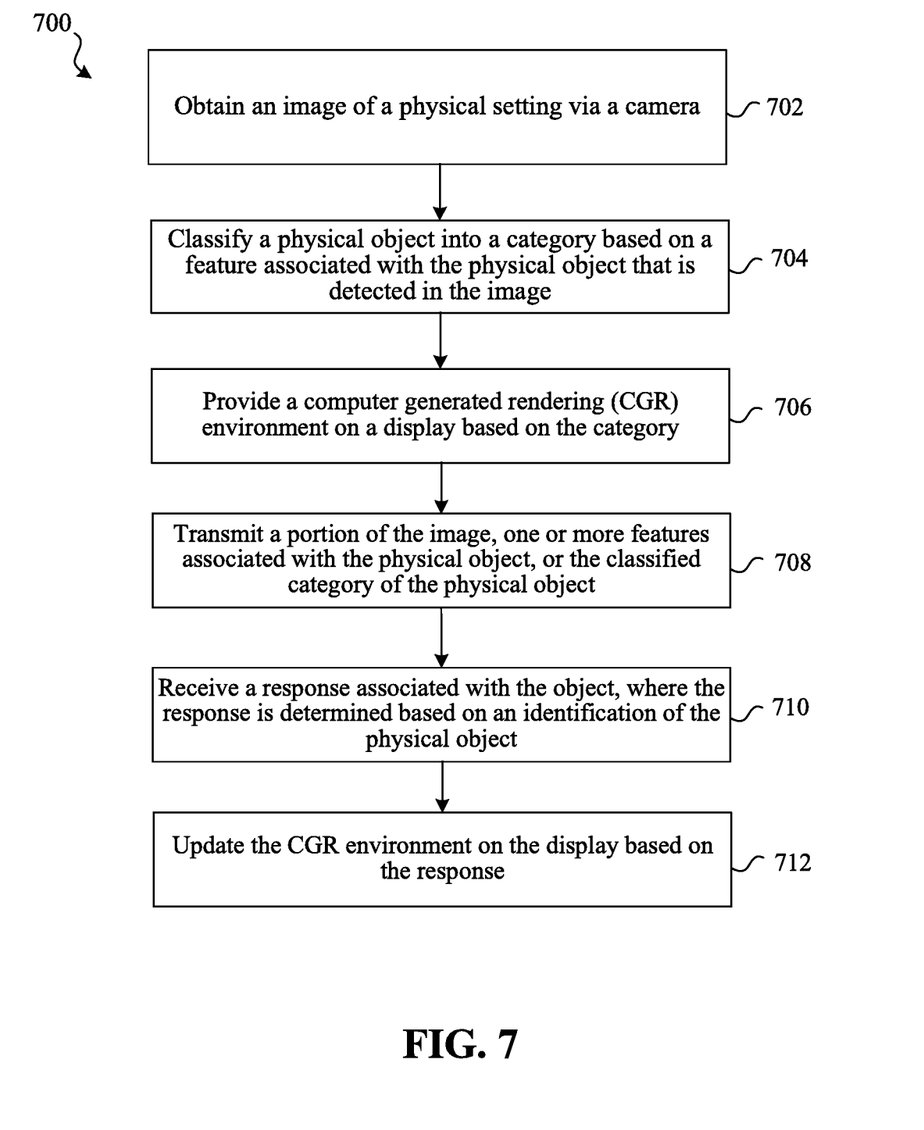
FIG. 7 is a flowchart illustrating an exemplary method of providing a CGR environment, according to some implementations.

FIG. 7 is a flowchart illustrating an exemplary method of providing a CGR environment, according to some implementations. In some implementations, the method 700 is performed by a device (e.g., device 120 or device 145 of FIGS. 1-6). The method 700 can be performed at a mobile device, HMD, desktop, laptop, server device, or by multiple devices in communication with one another. In some implementations, the method 700 is performed by processing logic, including hardware, firmware, software, or a combination thereof. In some implementations, the method 700 is performed by a processor executing code stored in a non-transitory computer-readable medium (e.g., a memory).

At block 702, the method 700 obtains an image or video of a physical setting via a camera. In one example, the image or video is collected based on a user input or selection and, in another example, the image or video is automatically collected by the device.

At block 704, the method 700 classifies a physical object into a category based on a feature associated with the physical object that is detected in the image or video. In one example, the physical object is an electronic device (e.g., a laptop) and is categorized based on a coarse recognition of any one or combination of features including shape, color, size, volume, markers, etc. Moreover, in another example, a particular portion of the image or video is identified as containing the physical object.

At block 706, the method 700 provides a computer generated rendering (CGR) environment on a display based on the category. In one example, the CGR environment includes a generic representation or identification of the physical object, as well as other depictions of the physical setting.

At block 708, the method 700 transmits a portion of the image or one or more features associated with the physical object. In one example, the image or video, or portion of the image or video, is transmitted to a remote server or cloud computing device. In another example, features associated with the physical object are transmitted to another local device. Moreover, transmission of any image or video data may be based on a determination that the image or video satisfies privacy criteria (e.g., user-defined privacy settings, identification of personal data, etc.). In an example, the method 700 may also transmit the category determined at block 704.

At block 710, the method 700 receives a response associated with the object, where the response is determined based on an identification of the physical object. In an example, the response is received from a remote or local device and includes an identification of a sub-category, an identification of a particular type of item (e.g., a model number), supplemental information (e.g., a user's manual), or a physical condition. Moreover, the response may generate an experience associated with the object (e.g., triggering an animation, providing a 3-D pose, etc.).

At block 712, the method 700 updates the CGR environment on the display based on the received response. In one example, the method 700 changes the depiction of the generic representation or identification of the physical object to a more specific representation or identification of the physical object. In another example, the method 700 displays additional information or resources proximate to the representation of the physical object. For example, a depicted categorization of the physical object may be changed to an identification of the physical object. In yet another example, a user's manual could be displayed adjacent to the physical object. In another example, the method 700 may display an animation associated with the object, such as a 3-D pose or a CAD model.

The various implementations disclosed herein provide techniques for classifying and identifying physical objects that conserve computational resources and allow for faster processing times. For example, a user may wearing an HMD may want information about their surroundings. However providing such information can require that the HMD perform segmentation and object recognition on the incoming video stream, which is computationally expensive and time consuming. Thus, an undesirable experience occurs if a user walks into a room and there is a considerable delay before anything is recognized, this creates an undesirable experience for the user.

However, according to some implementations, coarse recognition of objects is performed on the HMD to quickly provide basic information about the objects. Moreover, a coarse idea identification of the objects is also sent to a server or cloud computing device, where a more detailed analysis is performed to obtain and return a fine-grained recognition. The server or cloud computing device may also send information to the HMD that will facilitate identification by the HMD of the object in the future. For example, the information sent by the HMD to the server or cloud computing device may include a slimmed down version of the visual search. The information received by the HMD from the server or cloud computing device could include an abstract representation of the learned version of the object or a simultaneous localization and mapping (SLAM) point cloud mixed with meta information. Furthermore, the HMD may maintain a persistence for memory of objects owned by or otherwise associated with a particular user.

In an example, a device may store information regarding previously identified physical objects for later use or reference. In an example use case, a user at a retail store may identify a physical object such as a table. The user may then check to see if the table will fit in the user's home or office based on prior identification of the physical objects in the user's home or office.

Moreover, in an MR application, a view of a physical object may be replaced by a device with a virtual object. Initially, the physical object may be replaced by the device with a generic version of the object, but then the view may be refined with a more specific 3D representation of the object based on information received from the server or cloud computing device.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
   at a first device with a processor, a display, and a camera:
   obtaining an image or video of a physical setting via the camera;
   classifying a physical object into a category based on a feature associated with the physical object that is detected in the image or video;
   providing a computer generated rendering (CGR) environment on the display, the CGR environment comprising first virtual content associated with the physical object, the first virtual content comprising generic virtual content that is based on the category;
   transmitting a portion of the image or video, the feature, or the category to a second device;
   receiving a response associated with the physical object, the response determined based on an identification of the physical object performed by the second device; and
   updating the CGR environment on the display, wherein updating the CGR environment comprises replacing the first virtual content with second virtual content based on the response, wherein the second virtual content comprises object-specific content based on the response.

2. The method of claim 1, wherein providing the CGR environment comprises replacing, enhancing, or supplementing the physical object with the generic virtual content, wherein the generic virtual content is from an asset store residing on the first device based on the category.

3. The method of claim 2, wherein the object-specific content is based on information about the physical object.

4. The method of claim 1, wherein classifying the physical object into the category is based on a coarse recognition of the physical object.

5. The method of claim 1, wherein the portion of the image or video excludes a second portion of the image or video.

6. The method of claim 1, wherein the feature is a shape, a color, a size, a volume, or a marker.

7. The method of claim 1, wherein the response includes an identification of a sub-category, an identification of a particular type of item, or supplemental information.

8. The method of claim 1, further comprising:
determining whether the image or video satisfies privacy criteria; and
determining the portion of the image or video based on the satisfaction of the privacy criteria.

9. The method of claim 1, further comprising determining whether to transmit the portion of the image or video based on privacy criteria.

10. The method of claim 1, further comprising transmitting the category to the second device.

11. The method of claim 1, wherein the received response associated with the physical object includes identification data to be used by the first device to identify the physical object in a future image or video.

12. The method of claim 1, wherein the response associated with the physical object includes an assessment of a condition of the physical object.

13. The method of claim 1, wherein the first device is a head mounted device (HMD).

14. The method of claim 1, wherein the first device is a mobile electronic device.

15. A system comprising:
a first device with a display and a camera;
a processor; and
a computer-readable storage medium comprising instructions that upon execution by the processor cause the system to perform operations, the operations comprising:
obtaining an image or video of a physical setting via the camera
classifying a physical object into a category based on a feature associated with the physical object that is detected in the image or video;
providing a computer generated rendering (CGR) environment on the display, the CGR environment comprising first virtual content associated with the physical object, the first virtual content comprising generic virtual content that is based on the category;
transmitting a portion of the image or video, the feature, or the category to a second device;
receiving a response associated with the physical object, the response determined based on an identification of the physical object performed by the second device; and
updating the CGR environment on the display, wherein updating the CGR environment comprises replacing the first virtual content with second virtual content based on the response, wherein the second virtual content comprises object-specific content based on the response.

16. The system of claim 15, wherein providing the CGR environment comprises replacing, enhancing, or supplementing the physical object with the generic virtual content, wherein the generic virtual content is from an asset store residing on the first device based on the category.

17. The system of claim 16, wherein the object-specific content is based on information about the physical object.

18. The system of claim 15, wherein classifying the physical object into the category is based on a coarse recognition of the physical object.

19. The system of claim 15, wherein the portion of the image or video excludes a second portion of the image or video.

20. A non-transitory computer-readable storage medium storing program instructions that are executable by a processor to perform operations comprising:
obtaining, by a first device including a camera and a display, an image or video of a physical setting via the camera;
classifying, by the first device, a physical object into a category based on a feature associated with the physical object that is detected in the image or video;
providing a computer generated rendering (CGR) environment on the display, the CGR environment comprising first virtual content associated with the physical object, the first virtual content comprising generic virtual content that is based on the category;
transmitting a portion of the image or video, the feature, or the category to a second device;
receiving a response associated with the physical object, the response determined based on an identification of the physical object performed by the second device; and
updating the CGR environment on the display, wherein updating the CGR environment comprises replacing the first virtual content with second virtual content based on the response, wherein the second virtual content comprises object-specific content based on the response.

* * * * *